US010591623B2

(12) United States Patent
Jaaskelainen et al.

(10) Patent No.: US 10,591,623 B2
(45) Date of Patent: Mar. 17, 2020

(54) MULTILATERAL WELL SENSING SYSTEM (71) Applicant: Halliburton Energy Services, Inc., Houston, TX (US)

(72) Inventors: Mikko Jaaskelainen, Katy, TX (US); Brian Vandellyn Park, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 153 days.

(21) Appl. No.: 15/775,748

(22) PCT Filed: Dec. 16, 2015

(86) PCT No.: PCT/US2015/065984
§ 371 (c)(1),
(2) Date: May 11, 2018

(87) PCT Pub. No.: WO2017/105428
PCT Pub. Date: Jun. 22, 2017

(65) Prior Publication Data
US 2018/0348389 A1 Dec. 6, 2018

(51) Int. Cl.
*G01V 1/22* (2006.01)
*G01V 1/42* (2006.01)
(Continued)

(52) U.S. Cl.
CPC .......... *G01V 1/226* (2013.01); *E21B 41/0035* (2013.01); *E21B 41/0085* (2013.01);
(Continued)

(58) Field of Classification Search
CPC ...... E21B 47/14; E21B 47/123; E21B 43/305; E21B 41/0035; G01V 1/22; G01V 1/42; G01V 8/16; G01V 8/24
(Continued)

(56) References Cited

U.S. PATENT DOCUMENTS

| 5,862,273 A | | 1/1999 | Pelletier |
| 6,065,538 A | * | 5/2000 | Reimers ................. E21B 23/03 166/250.01 |

(Continued)

FOREIGN PATENT DOCUMENTS

| CA | 2547710 A1 | 6/2005 |
| WO | 2015020642 A1 | 2/2015 |

OTHER PUBLICATIONS

International Search Report and the Written Opinion for International Application No. PCT/US2015/065984 dated Sep. 2, 2016, 13 pages.

*Primary Examiner* — Kenneth L Thompson
(74) *Attorney, Agent, or Firm* — Chamberlain Hrdlicka (57) ABSTRACT Example systems and methods are described for performing multilateral well sensing in a downhole environment. In an example system, a cased parent wellbore and a cased lateral wellbore intersect at a lateral junction. A sensor is deployed within the cased lateral wellbore that communicably couples to a transmitter module, wherein the transmitter module is deployed within the cased lateral wellbore downhole of the lateral junction and configured to generate acoustic signals. An optical fiber cable is deployed within the cased parent wellbore and configured to receive acoustic signals transmitted by the transmitter module in the cased lateral wellbore.

17 Claims, 4 Drawing Sheets (51) Int. Cl.
  *E21B 47/14* (2006.01)
  *E21B 47/12* (2012.01)
  *E21B 41/00* (2006.01)
  *E21B 47/06* (2012.01)
  *E21B 47/10* (2012.01)
  *G01V 1/46* (2006.01)

(52) U.S. Cl.
  CPC ............ *E21B 47/06* (2013.01); *E21B 47/065* (2013.01); *E21B 47/101* (2013.01); *E21B 47/123* (2013.01); *E21B 47/14* (2013.01); *G01V 1/42* (2013.01); *G01V 1/46* (2013.01)

(58) Field of Classification Search
  USPC .......................................................... 166/50
  See application file for complete search history.

(56) References Cited

U.S. PATENT DOCUMENTS

| | | | |
|---|---|---|---|
| 8,203,461 B2 | 6/2012 | Tubel | |
| 8,319,657 B2 | 11/2012 | Godager | |
| 8,469,084 B2 | 6/2013 | Clark et al. | |
| 9,249,559 B2* | 2/2016 | Dyer | E03B 3/14 |
| 2001/0013412 A1 | 8/2001 | Tubel | |
| 2001/0020675 A1 | 9/2001 | Tubel et al. | |
| 2003/0094281 A1 | 5/2003 | Tubel | |
| 2003/0127232 A1 | 7/2003 | Bussear et al. | |
| 2008/0143552 A1 | 6/2008 | Mallison et al. | |
| 2012/0152024 A1* | 6/2012 | Johansen | E21B 47/123 73/655 |
| 2013/0087325 A1* | 4/2013 | Bartko | E21B 41/0035 166/250.1 |
| 2015/0021009 A1* | 1/2015 | Skinner | E21B 47/00 166/66 |
| 2015/0167452 A1 | 6/2015 | Godager et al. | |
| 2015/0292320 A1* | 10/2015 | Lynk | E21B 47/123 367/82 |
| 2015/0292321 A1* | 10/2015 | Keller | E21B 47/12 367/81 |
| 2016/0108728 A1* | 4/2016 | Freese | E21B 47/122 166/250.01 |
| 2019/0203591 A1* | 7/2019 | Disko | E21B 47/14 |

* cited by examiner

MULTILATERAL WELL SENSING SYSTEM

BACKGROUND

Oil and gas wells can be drilled having various configurations, such as, vertical, extended reach, deviated or horizontal, and multilateral wells. The multilateral well is a single well with one or more lateral wellbore branches that extend from a single parent wellbore into the surrounding formation. It is often desirable to monitor the physical conditions inside the lateral branches to ensure proper operations of the well.

The instrumentation of wells using fiber optics-based distributed systems, such as distributed temperature sensing (DTS), distributed acoustic sensing (DAS), and other sensing systems based on, for example, interferometric sensing is well established. Optical fiber can be run inside the well (in some cases on the outside of a tubing string), to the surface, where interrogators detect reflected light from the entire length of the fiber and/or single or multi point sensors. However, in some cases, there are structures in the well which prevent, or make difficult, fiber from being installed over the entire length of the well, or at least over all regions of interest of the well. For example, in multilateral well systems, packers or bridge plugs, or similar devices, are often used to provide hydraulic isolation of zones within the well, and wells will often include isolation of multiple zones and/or lateral branches. These packers or bridge plugs preclude passage of a fiber through the interior of the casing. As a result, it can be difficult for operators to monitor performance in the lateral branches of multilateral wells due to difficulties with providing physical communications with sensors in the lateral branches.

DETAILED DESCRIPTION

To address some of the challenges described above, as well as others, systems and methods are described herein that operate to monitor conditions in multilateral wells, and to convey measurements of such conditions to the surface notwithstanding structures in place obstructing the interior of the casing in multilateral wells.

Figure 1:
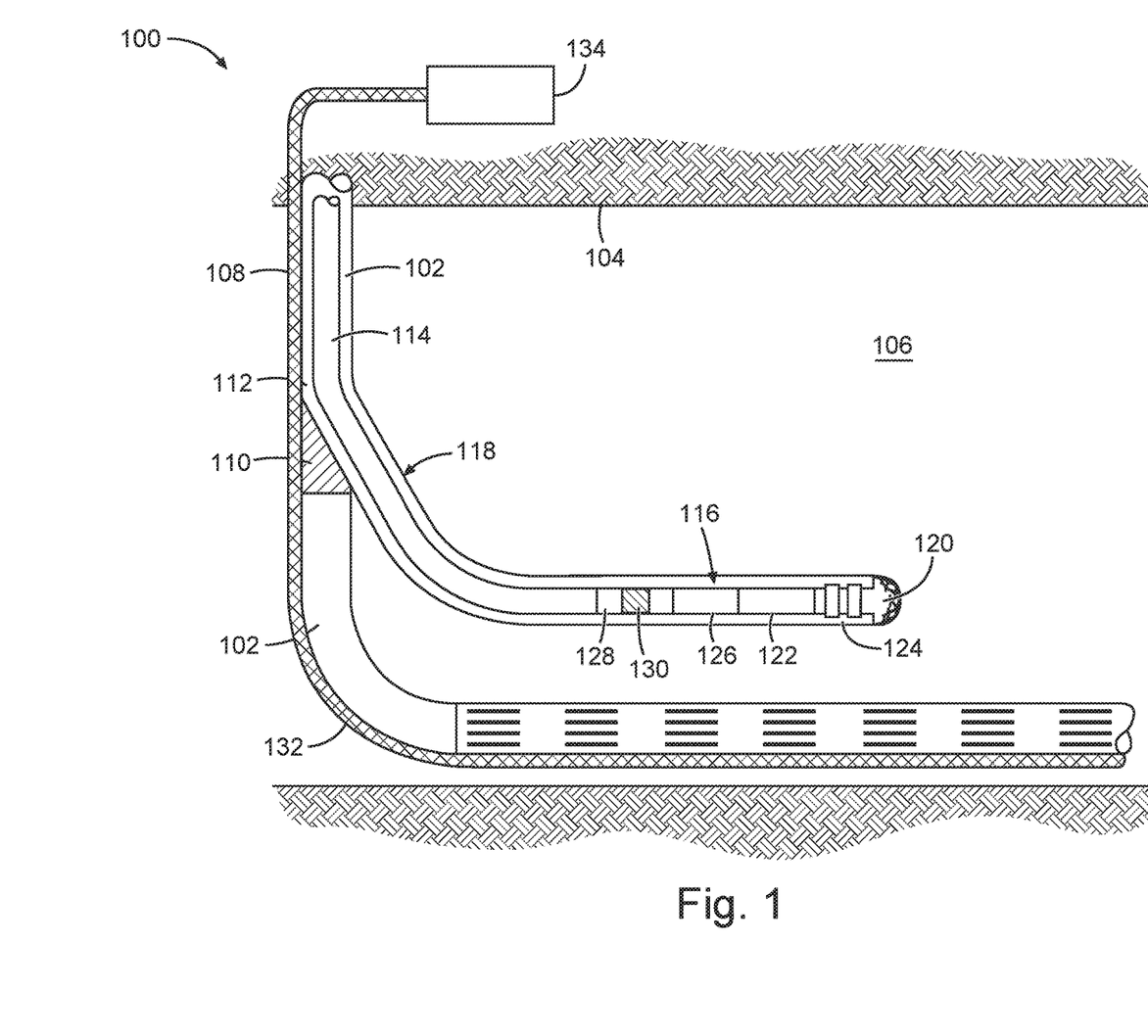
FIG. 1 is a schematic diagram illustrating a multilateral well system, according to one or more embodiments.

FIG. 1 is a schematic diagram illustrating a multilateral well system 100, according to one or more embodiments. In multilateral well system 100, a parent wellbore 102 is drilled extending through formation 104 into a formation of interest 106 containing hydrocarbons. Lateral wellbore branches can be drilled based on, for example, measurements acquired by logging operations (e.g., operations that involve the use of acoustic, resistive, nuclear magnetic resonance (NMR) tools, etc.) in the parent wellbore 102 and geologic surveys (e.g., vibroseis seismic surveys or wellbore surveys) of the surrounding formations. Those skilled in the art will readily recognize that the principles described herein are applicable to land-based, subsea-based, or sea-based operations, without departing from the scope of the disclosure. The parent wellbore 102 is cased by a casing string 108, which lines and supports the parent wellbore 102. Although not specifically depicted, the casing string 108 can be cemented in place inside the wellbore 102.

To drill lateral branches, a deflection assembly and packer 110 are positioned at the multilateral junction 112. The deflection assembly and packer 110 guide the trajectory of a drill string 114 having a bottom hole assembly (BHA) 116 through the multilateral junction 112 away from the parent wellbore 102 to drill a lateral wellbore 118. In accordance with some implementations, the BHA 116 includes a drill head 120 for drilling through the formation of interest 106 and a steerable system to set the direction of the drill head 120. A downhole motor assembly 122 rotates the drill head 120. As the drill head 120 rotates, it extends the lateral wellbore 118 through the formation of interest 106. The downhole motor assembly 122 may include a rotary steerable system (RSS) 124 that enables a drilling crew to steer the lateral wellbore 118 along a desired path. It is noted that, in some embodiments, the parent wellbore 102 or any lateral branches can be cased with, for example, slotted liner, which allows for hydrocarbons to enter the well.

The drill head 120 and downhole motor assembly 122 form a portion of BHA 116 that includes one or more drill collars (e.g., thick-walled steel pipe) to provide weight and rigidity to aid the drilling process. It is noted that various subs or tool assemblies may be located along the drill string 114 and/or in the BHA 116. As the BHA 116 passes through various regions of the formation of interest 106, information may be obtained. For example, the BHA 116 can include a resistivity logging tool 126 that collects measurements relating to various formation properties as well as tool orientation and/or other drilling conditions. As the drill head 120 extends the lateral wellbore 118 through the formation of interest 106, the resistivity logging tool can collect measurements of parameters such as position, orientation, weight-on-bit, borehole size, drilling fluid resistivity, and various other drilling conditions. In some embodiments, the BHA further includes a magnetometer tool 128 having a 3-axis magnetometer 130 for use in magnetic ranging while drilling operations. It should be noted that the BHA can include telemetry tools and/or other downhole tools for use in a drilling environment.

The embodiments described below make use of electro acoustic technology ("EAT") sensors and sensing technology. The EAT sensors and EAT sensing technology described in this disclosure is a recently developed technology and has been described in a recently published PCT application: WO2015020642A1.

EAT sensors represent a new approach to fiber optic sensing in which any number of downhole sensors, electronic or fiber optic based, can be utilized to make the basic parameter measurements, but all of the resulting information is converted at the measurement location into perturbations or a strain applied to an optical fiber cable that is connected to an interrogator that may be located at the surface of a downhole well. The interrogator may routinely fire optical signal pulses downhole into the optical fiber cable. As the pulses travel down the optical fiber cable, back scattered light is generated and is received by the interrogator.

The perturbations or strains introduced to the optical fiber cable at the location of the various EAT sensors can alter the back propagation of light and those effected light propagations can then provide data with respect to the signal that generated the perturbations.

The depicted example EAT system includes surface components to send signals induced into an optical fiber cable by a downhole sensor system, as will be described below. An EAT receiver 134 or "interrogator" at the surface is coupled to an optical fiber cable 132 which extends, in this described configuration, longitudinally along the well, as addressed in more detail below. Light signals propagating in the optical fiber cable 132 will be analyzed the interrogator unit 134 to extract a signal from the optical fiber. The optical fiber cable 132 can include any combination of lines in addition to at least one optical fiber (e.g., additional optical fibers, as well as, potentially, electrical, and/or hydraulic lines) and reinforcements. Multiple fibers within one optical fiber cable 132 can offer redundancy and/or the ability to interrogate with different instrumentation simultaneously.

The optical fiber cable 132 will, in many embodiments, be part of a DAS fiber system where coherent Rayleigh scattering is used to detect the acoustic signal; or may be implemented through other forms of interferometry based on, for example, Michelson, Mach-Zehnder, Fabry-Perot principles etc. Light signals propagating in the optical fiber cable 132 will be analyzed to extract the signal from the optical fiber.

The interrogator 134 can be structured, for example, to inject a laser pulse into the optical fiber 132. As the pulse travels down the optical fiber, Rayleigh back scattered light is generated by impurities within the silica lattice structure of the optical fiber. The backscattered light from the pulses will interfere with each other, generating a signal amplitude that is dependent on the amount of strain on the optical fiber. The signal is effectively a representation of the instantaneous strain on the optical fiber, which can be generated by acoustic signals (vibrational impulses) acting upon the fiber.

In a system implemented to use Rayleigh scattering, the Rayleigh back-scattered light is collected at the surface using the interrogator 134 and recombined with the input signal to determine an amplitude and phase associated with the depth from which the signal came. In this way, a value of the measured pressure is extracted by receiving the optical signal resulting from the perturbation of the fiber. However, it is noted that the scope of this disclosure is not limited to use of any particular type of interrogator, and can be practiced using optical interrogators including any particular combination of optical components to interrogate optical fiber cable 132.

It is to be recognized that system 100 is merely exemplary in nature and various additional components can be present that have not necessarily been depicted in FIG. 1 in the interest of clarity. Non-limiting additional components that can be present include, but are not limited to, supply hoppers, valves, condensers, adapters, joints, gauges, sensors, compressors, pressure controllers, pressure sensors, flow rate controllers, flow rate sensors, temperature sensors, and the like. Such components can also include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the multilateral well system generally described above and depicted in FIG. 1.

Multilateral wells are often categorized based on the amount and type of support provided at the lateral junction (e.g., multilateral junction 112 of FIG. 1) between lateral branches and the parent wellbore. For example, multilateral wells are categorized according to levels of increasing complexity, cost, and functionality from Level 1 (e.g., the least expensive) through Level 6 (e.g., the most complex and expensive, but provides the most in terms of both mechanical and pressure integrity of the multilateral system).

Level 1 multilaterals comprise an openhole (e.g., uncased) parent wellbore with openhole lateral branches. The junctions in Level 1 multilaterals have no mechanical support or hydraulic isolation, with the integrity of the junctions depending largely on natural borehole stability. Level 2 multilaterals comprise a cased parent wellbore, but the lateral branches remain openhole. As with Level 1 multilaterals, there is no mechanical support of the lateral junction, but slotted liners (e.g., slotted liner 134 of FIG. 1) can be run into the lateral branches to help maintain borehole stability. Level 3 multilaterals comprise a cased and cemented parent wellbore, with cased lateral branches. Slotted liners can be set in the lateral branches and anchored back into the parent wellbore by a liner, but are not cemented. The junctions in Level 3 multilaterals have mechanical support but lacks hydraulic isolation. Level 4 multilaterals comprise a cased and cemented parent wellbore, and further includes cased and cemented lateral branches. The junctions in Level 4 multilaterals are mechanically supported, with lateral liners being cemented to the casing of the main wellbore. It is noted that there is no pressure seal the junction interface between the lateral and the parent wellbore.

Level 5 multilaterals are similar in construction to that of Level 4, with the further addition of completion equipment to provide a pressure seal across the multilateral junction. For example, packers are placed in both the parent wellbore and lateral branches below the junction and connected by tubing strings to an isolation packer located above the junction in the parent wellbore. By using tubing strings and packers to isolate the junction, pressure integrity is achieved. Level 6 multilaterals use pressure seal at the junction of the lateral liner and the parent wellbore casing to achieve a pressure-tight junction. This often uses a solid metal junction that is part of the parent wellbore casing that provides the highest degree of pressure and mechanical integrity.

As noted, it is desirable to monitor the pressure in the lateral branches, to monitor the flow of fluids such as oil and water into the lateral branches, and the temperatures experienced in the lateral branches. If sensors are deployed in the lateral branches, they must have a means for communicating their measurements back to the surface via the parent wellbore and/or have a power source to operate the sensors. However, the construction of multilateral wells, particularly Level 3 through 5 types, make it difficult to run fiber or cables directly into the lateral branches to communicate with and provide power to the sensors.

Figure 2:
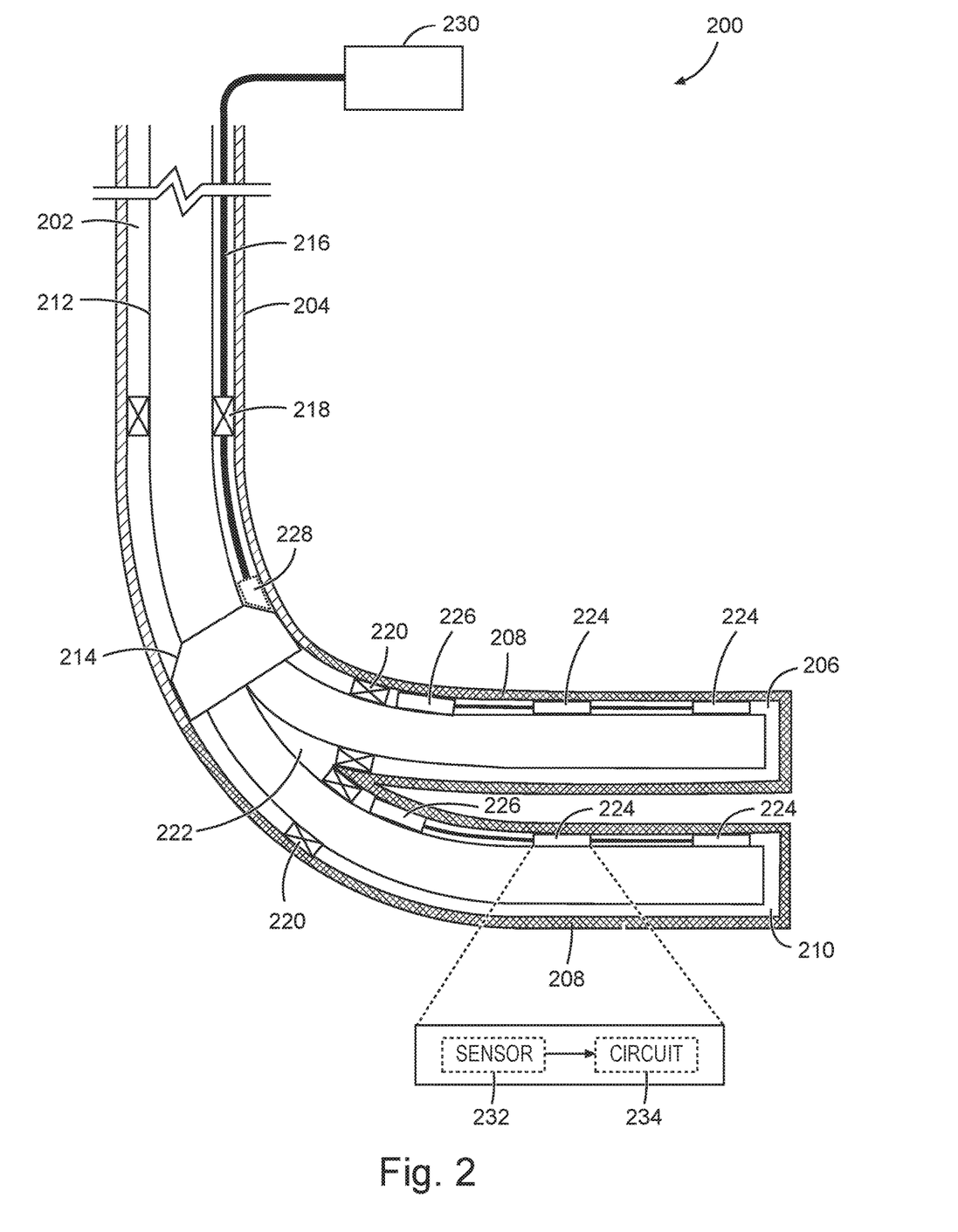
FIG. 2 is a schematic view of a multilateral well sensing system, according to one or more embodiments.

For example, FIG. 2 illustrates a schematic view of a multilateral well sensing system 200, according to one or more embodiments. It is noted that although the embodiment of FIG. 2 is depicted for a Level 5 multilateral, it should be appreciated by those of ordinary skill in the art that this disclosure is applicable to any of the multilateral Levels 1-6. In multilateral well sensing system 200, a parent wellbore 202 has been drilled and a casing 204 (e.g., production casing) has been inserted and cemented to define a cemented well casing. The parent wellbore 202 is shown as being vertically oriented, but it can also be deviated or horizontal.

A first lateral wellbore 206 is drilled and completed in a known manner using liner 208 or another tubular which, for example, attaches to the casing 204 by a suitable liner hanger (not shown) to prevent the lateral branch from collapsing. Similarly, a second lateral wellbore 210 is drilled and completed in a known manner using liner 208 or another tubular which, for example, attaches to the casing 204 by a suitable liner hanger (not shown) to prevent the lateral branch from collapsing. The multilateral well can have additional lateral branches, but only two are shown for the sake of simplicity. Further, a lateral branch (e.g., second lateral wellbore 210) can be used as part of the parent wellbore, with further lateral branches extending from it.

A tubular 212 (e.g., production tubing) is suspended inside the parent wellbore 202 for recovery of fluids to the earth's surface. A selective re-entry tool 214 is positioned inside the parent wellbore 202 that is run on the tubular 212 and tied back to the surface to, for example, a standard wellhead (not shown). The selective re-entry tool 214 is run on the tubular 212 to enable an operator to select a desired lateral branch (e.g., first lateral wellbore 206 or second lateral wellbore 210) so as to enter with a coil tubing (or the like) for performing desired operations (e.g., stimulation, fracture, cleanout, etc.).

An optical fiber cable 216 runs longitudinally through the parent wellbore 202. The optical fiber cable 216 is depicted in FIG. 2 as extending longitudinally through the wellbore 202 in the annulus between the tubular 212 and the casing 204. However, it should be noted that in other embodiments, the optical fiber cable 216 can also run outside the casing 204 (e.g., as depicted in FIG. 1), in the cement external to the casing 204, or via a wall of the tubular 212. These positions are merely described as examples of optical fiber cable positions, but any position may be used as appropriate for the circumstances.

The optical fiber cable 216 is primarily sensitive along its axis, making it analogous to a single component, continuous component geophone oriented along the wellbore (which itself could be deviated and changing orientation), that allows for the recording of acoustic impulses (which may be intentionally generated acoustic signals). An "acoustic signal" as utilized herein is any vibrational signal (which may also be considered as a varying compressional signal), whether humanly audible or not, which may be detected to result in communication of the signal (and/or any data represented by the signal) from one location to another. At low frequencies, the optical fiber cable 216 can be sensitive to temperature variation as well as to acoustic sources.

Packers are mounted on production tubing and used to isolate fluid flow by providing a fluidic seal that prevents comingling flow of produced fluids through the well. Packers can be used to isolate the tubular 212 from the casing 204, so as to force produced fluids to flow inside the tubular 212 to the surface. Packers can also be used in the lateral wells to isolate flow from different sections along the length of the lateral well. For example, as depicted in FIG. 2, packers 218 are deployed in the parent wellbore 202 between tubular 212 and casing 204 to hydraulically isolate uphole sections of the casing 204 from any produced fluids. Packers 220 are used to seal off the first lateral wellbore 206 and the second lateral wellbore 210 from parent wellbore 202, and isolates fluid flow from each individual lateral branch. However, completion hardware such as selective re-entry tool 214 and packers 218, 220 make it difficult to run fibers such as optical fiber cable 216 from the multilateral junction 222 into the lateral branches, and thus, make it difficult to connect power and/or data communication lines to sensors and gauges in the lateral branches for monitoring well conditions.

Although running an optical fiber cable 216 in the parent wellbore 202 can provide an estimate of the total production from each lateral, it alone cannot provide individual production profiles within each lateral branch 206, 210. Information regarding production profiles within each lateral enables optimization of production by, for example, a monitor of where gas and/or water fingering occurs. Injection well parameters may be changed to minimize these effects if certain production zones can be tied to certain injection wells through reservoir modeling and/or seismic models. Different depths in the lateral branches can potentially have different reservoir layers with different characteristics, in which injection and/or production profiles and patterns are significantly different. Monitoring laterals at different depths would be beneficial for improved modeling and control.

Thus, the lateral branches 206 and 210 each include one or more sensor modules 224 that are operable to provide a measurement relating to wellbore conditions within each lateral branch. Each lateral branch may operate at a different pressure, temperature and/or flow rate compared to other lateral wellbores and to the parent wellbore. If these parameters can be monitored, valves (not shown) located at the multilateral junctions 220 can be regulated to control the inflow of produced hydrocarbons to the parent wellbore 202. Such control can enhance the overall production from the well.

In one embodiment, each sensor module 224 can include one or more sensors 232 for measuring temperature, pressure, and/or flow rate based on electro-acoustic technology (EAT). However, the sensor 232 can be realized in a number of different ways depending on a parameter of interest to be monitored. The parameter of interest can include, but is not limited to, pressure, strain, resistivity, chemical composition, chemical concentration, flow rate, temperature, or gas/liquid ratios. Further, the sensor 232 can include, but is not limited to: seismic, chemical, electromagnetic, resistive, inductive, pH, and other sensors for wellbore sensing in hydrocarbon wells.

Each sensor module 224 can be self-powered, receiving energy from fluid flow using, for example, vortex energy harvesters or a similar energy harvester, to charge batteries that power the electronics of the sensor. Such energy harvesters use vortex induced vibration from fluid flow to create mechanical energy, which is harnessed using piezo electric crystals to convert the mechanical energy to electrical energy. This electrical energy is sufficient to power sensor electronics in the sensor modules. This makes each sensor module 224 autonomous, requiring no power source or wiring from the surface. Alternatively, the sensor module 224 can include a battery or a non-wired energy source.

In one example, the sensor modules 224 include EAT flow sensors mounted in the lateral branches 206, 210 in front of production zones. The EAT flow sensors can measure fluid velocity and acoustic velocity in the fluid to determine, for example, gas/liquid ratios, temperature, and pressure. By positioning a sensor module 224 at the front of each production zone, the flow of that zone can be determined by subtracting out the flow of previous zones. The sensor nearest a transmitter module 226 measures the total flow for that lateral.

Data from the sensor modules 224 is forwarded to processing circuitry that is structured to receive the measured parameter (e.g., pressure or flow in a lateral wellbore) and generate a parameter signal correlated to the parameter. In some embodiments, processing circuitry 234 can be connected to the sensor 232 to receive the measured parameter (e.g., pressure or flow rate). The processing circuitry 234 may be configured to operate in either the analog or the digital domain, depending on the characteristics of sensor 232 and the output which it provides. A portion of the processing circuitry for generating a parameter signal from the sensor 232, the processing circuitry 234 may include, for example, an analog-to-digital convert, as well as various pulse limiting, pulse shaping, filtering, or amplification circuits, as well as other individual circuits. Such structures may be configured to remove any undesired portions of the sensor signal, and to condition the signal for communication as an acoustic signal. In some cases, the processing circuitry 234 may receive an analog signal from the sensor 232, and process the signal entirely in the analog domain. In other embodiments, processing circuitry 234 is included as part of the transmitter module 226. The analog or digital signals generated at sensor modules 224 are communicated to a transmitter module 226 for conversion into a data transmission using, for example, an acoustic signal generator.

The sensor modules 224 are communicably coupled and connected in series to the transmitter module 226 by electrical or optical means to transmit the data measured by sensors 232 and processed at processing circuitry 234. In one embodiment, the transmitter module 226 is connected to the sensors 224 using electrical wiring. The transmitter module 226 is generally located behind the packers 220 at the multilateral junction 220 but may also be located up-hole of the packers 220. Alternatively, the sensors can be connected in parallel or other means of providing redundancy. In some embodiments, the sensor modules 224 are electrically coupled to each other and up to the transmitter module 226. In various embodiments, frequency multiplexing, time-domain multiplexing, or the usage of multiple electrical cables can be used to connect the sensor modules 224.

In some embodiments, the transmitter module 226 will preferably include or be connected to a transducer (which may be any of various forms), which operates as an acoustic signal generator to create an acoustic signal sufficient to perturb optical fiber cable 216. An "acoustic signal" as utilized herein is any vibrational signal (which may also be considered as a varying compressional signal), whether humanly audible or not, which may be detected to result in communication of the signal (and/or any data represented by the signal) from one location to another.

The transducer is an acoustic signal generator that communicates an acoustic signal across the multilateral junction 220, either through fluids in the well or through production tubing, to the optical fiber cable 216. For example, such a transducer can be constructed as a vibrator, or other oscillating device. The transducer can include non-contact, piezo electric material (e.g., piezo-ceramics) that emits acoustic energy. In this way, the vibrations of the acoustic signal can be transferred from the transducer through fluids, packers, or any intervening elements between the transmitter module 226 and the optical fiber cable 216. In some embodiments, the transducer can be a voice coil actuator that generates signals at one or more frequencies sufficient to communicate to the optical fiber to induce a strain into the optical fiber cable 312. In this way, the transducer in the transmitter module 226 converts electrical sensor input (e.g., digital or analog signals from the sensor modules 224) into an acoustic frequency output that is emitted in proportion to the frequency of the electrical input.

It is noted that each transmitter module 226 is operated at a different frequency from each other, such that multiple transmitter modules can feed into a single optical fiber cable 216 without interference. Alternatively, the transmitter modules 226 can include multiple transducers to communicate signals at different times and/or frequencies and/or with one or more modulation schemes to facilitate redundancy of communications and/or error detection and/or correction capability.

In an alternative embodiment, the sensor modules 224 can be wireless by each containing their own transducer, rather than being electrically connected to a common transmitter module. In such an embodiment, the data from each wireless sensor module is transmitted using a transducer operating at a different frequency such that they can be distinguished from each other at a receiver. Alternatively, the data from each wireless sensor can be time division multiplexed with a unique identifier to distinguish from each other. It is noted that the transducer within each wireless sensor module can be integrated with the processing circuitry 234, integrated with the sensor 232, or can represent a separate structure coupled to the processing circuitry 234.

Ideally, the transmitter module 226 is positioned as close as possible to the optical fiber cable 216 to obtain higher quality signal transmission. It is noted that the transmitter module 226 can, in some embodiments, contain its own sensor electronics for providing a different data point from sensor modules 224.

The acoustic signals/acoustic energy transmitted by the transmitter module 226 is modulated onto the fiber optic cable 216 by generating perturbations to optical signals within the optical fiber cable 216. The perturbations in the optical fiber cable 216 alter the physical characteristics of the fiber to affect propagation of light. Disturbances in the light propagating through optical fiber 216 can be due to the acoustic signals, wherein the acoustic signals can change the index of refraction of the optical fiber cable 216 or mechanically deform the optical fiber cable 216 such that the Rayleigh backscatter properties of the optical fiber cable 216 change.

Thus, an analysis of the effects on light propagation can provide data regarding the acoustic signal that generated the perturbation and the measured wellbore parameter. In other words, an acoustic signal representative of a wellbore parameter (e.g., pressure, flowrate, or temperature) is provided to the optical fiber cable 216, thereby resulting in a light signal carried by the optical fiber cable 216 being modulated.

In some embodiments, the multilateral well sensing system 200 includes an optional receiver 228 that receives the acoustic signals from the lateral wellbores. The acoustic signal can be detected by, for example, receiver 228 positioned above the multilateral junction 220 in the parent wellbore 202. The receiver 228 can be self-powered, receiving energy from fluid flow using, for example, vortex energy harvesters or a similar energy harvester, to charge batteries that power the electronics of the receiver 228. This makes the receiver 228 autonomous, requiring no power source or wiring from the surface. Alternatively, the receiver 228 can include a battery, a non-wired energy source, or can be electrically wired from the surface.

The receiver 228 can be used when distances between transmitter modules 226 and the optical fiber cable 216 are large enough, if the transmitter modules 226 are not powerful enough, or if the transmitted acoustic signals are otherwise not strong enough to be detected by optical fiber cable 216. For example, if downhole conditions are such that the received signal to noise ratio at the optical fiber cable 216 is insufficient, the receiver 228 can be used to amplify and filter the acoustic signals coming from the lateral branches before transducing the received and modified acoustic signal onto the optical fiber cable 216. In one embodiment, the receiver 228 includes a piezo electric receiver that detects acoustic signal transmissions from transmitter modules 226. The receiver 228 is coupled to the optical fiber cable 216 and transmits the data it receives to the cable, resulting in perturbations to the optical fiber cable 216. The receiver 228 can include a transducer constructed as a vibrator, or other oscillating device. Thus, the receiver 228 is communicably coupled to the optical fiber 216 and can be used to amplify signals coming from lateral wellbores 206, 210. The amplified signals are modulated onto the fiber optic cable 216, which is communicably coupled to a surface interrogation unit 230. The structure and functionality of surface interrogation unit 230 was previously described in more detail with relation to interrogator 134 of FIG. 1, and thus, the details will not be repeated for the sake of simplicity.

It is noted that the optical fiber cable 216 in the parent wellbore 202 can include distributed acoustic sensing and distributed temperature sensing (DTS) fibers for measuring both acoustic signals arriving from each of the laterals and temperature. DTS fibers can used to derive flow properties based on temperature profiles. The flow properties can be monitored and updated over time.

Analysis using time of flight (time division multiplexing), frequency division multiplexing, and/or wavelength division multiplexing can provide for the location of the lateral and/or a particular sensor module 224 within each lateral. Sensor information can be correlated with data collected by from the DTS and DAS systems, where flow from each lateral can be estimated using the fiber optic cable 216 run in the main wellbore 202, enabling full wellbore characterization and inflow simulation based on DAS and DTS data.

It is noted that additional instrumented laterals (e.g., with their associated sensors and transmitters) and/or sensors in the parent wellbore (not shown) can be added at any point along the optical fiber cable 216 by adding an EAT device that couples the data to the optical fiber cable 216. Thus, the entire number of laterals and the parent wellbore can be monitored in real time over their complete lengths.

FIGS. 3A-3D are diagrams illustrating various multilateral well sensing configurations, according to one or more embodiments. It is noted that in each of these configurations, sensors and transmitters have been added to each lateral branch, wherein a transmitter module and one or more sensor modules are positioned in each lateral. The transmitter module is placed in close proximity to the main wellbore, which has a fiber optic sensing cable running to full depth or at least to a point downhole from the deepest lateral branch. This enables DAS sensing systems and/or other fiber optic sensing systems to be run over the entire length of the main well. The fiber optic sensing cable picks up a transmitted acoustic signal from the transmitter modules in the lateral branches. Optional receiver modules (e.g., EAT receivers) can be located in close proximity to the transmitter modules for receiving and amplifying acoustic signals to be modulated onto the fiber optic sensing cable. The structure and functionality of each of these components were described in more detail with relation to FIG. 2, and thus, the details will not be repeated for the sake of simplicity.

Figure 3A:
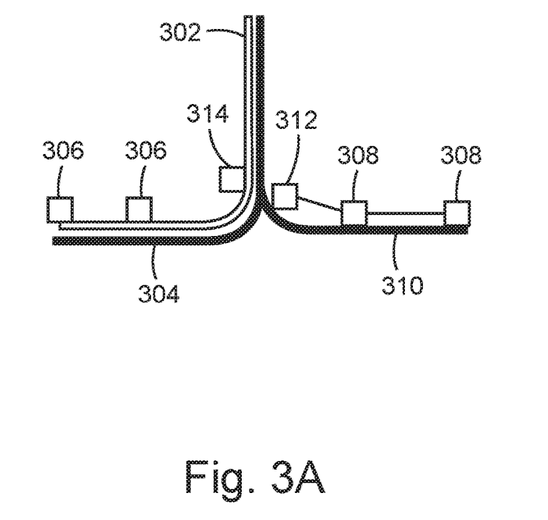
FIGS. 3A-3D are diagrams illustrating various multilateral well sensing configurations, according to one or more embodiments.

FIG. 3A illustrates a dual lateral branch configuration, wherein a fiber optic sensing cable 302 (such as fiber optic cable 216 described more fully above in relation to FIG. 2) is run full length to the end of a first lateral 304. Measurement data from sensors 306 can be transmitted to the fiber optic sensing cable 302 by vibration or acoustic pressure, as described herein. Sensors 308 positioned in the second lateral 310 are electrically coupled to a transmitter 312. Measurement data from sensors 308 can be received by the transmitter 312 and converted into an acoustic signal for transmittal to the fiber optic sensing cable 302. Optionally, the acoustic signal transmitted from the second lateral 310 can be received at receiver 314. In some embodiments, receiver 314 amplifies and filters the acoustic signals coming from second lateral 310 before transducing the received and modified acoustic signal onto the fiber optic sensing cable 302.

Figure 3B:
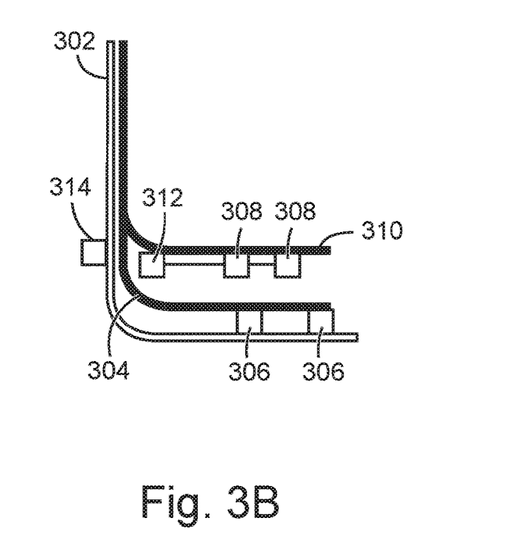

FIG. 3B illustrates a stacked lateral branch configuration, wherein a fiber optic sensing cable 302 is run full length to the end of a first lateral 304. Measurement data from sensors 306 can be transmitted to the fiber optic sensing cable 302 by vibration or acoustic pressure, as described herein. Sensors 308 positioned in the second lateral 310 are electrically coupled to a transmitter 312. Measurement data from sensors 308 can be received by the transmitter 312 and converted into an acoustic signal for transmittal to the fiber optic sensing cable 302. Optionally, the acoustic signal transmitted from the second lateral 310 can be received at receiver 314. In some embodiments, receiver 314 amplifies and filters the acoustic signals coming from second lateral 310 before transducing the received and modified acoustic signal onto the fiber optic sensing cable 302.

Figure 3C:
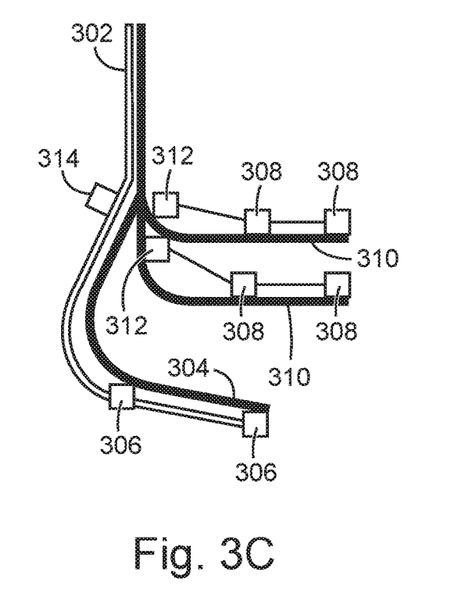

FIG. 3C illustrates a trilateral fork configuration, wherein a fiber optic sensing cable 302 is run in a first lateral 304 to a point downhole of laterals 310. Measurement data from sensors 306 can be transmitted to the fiber optic sensing cable 302 by vibration or acoustic pressure, as described herein. Sensors 308 positioned in laterals 310 are electrically coupled to a transmitter 312. Within each discrete lateral 310, measurement data from sensors 308 can be received by the transmitter 312 and converted into an acoustic signal for transmittal to the fiber optic sensing cable 302. It is noted that each transmitter 312 operates at a different frequency to provide the ability to discern an acoustic signal's originating lateral. Optionally, the acoustic signals transmitted from the laterals 310 can be received at receiver 314. In some embodiments, receiver 314 amplifies and filters the acoustic signals coming from laterals 310 before transducing the received and modified acoustic signal onto the fiber optic sensing cable 302.

Figure 3D:
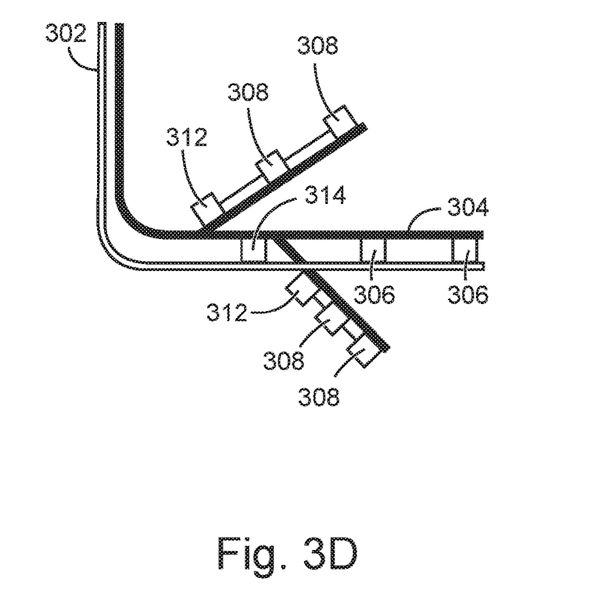

FIG. 3D illustrates a herringbone configuration, wherein a fiber optic sensing cable 302 is run full length to the end of a first lateral 304. Measurement data from sensors 306 can be transmitted to the fiber optic sensing cable 302 by vibration or acoustic pressure, as described herein. Sensors 308 positioned in laterals 310 branching off of the first lateral 304 are electrically coupled to a transmitter 312. Within each discrete lateral 310, measurement data from sensors 308 can be received by the transmitter 312 and converted into an acoustic signal for transmittal to the fiber optic sensing cable 302. It is noted that each transmitter 312 operates at a different frequency to provide the ability to discern an acoustic signal's originating lateral. Optionally, the acoustic signals transmitted from the laterals 310 can be received at receiver 314. In some embodiments, receiver 314 amplifies and filters the acoustic signals coming from laterals 310 before transducing the received and modified acoustic signal onto the fiber optic sensing cable 302.

Figure 4:
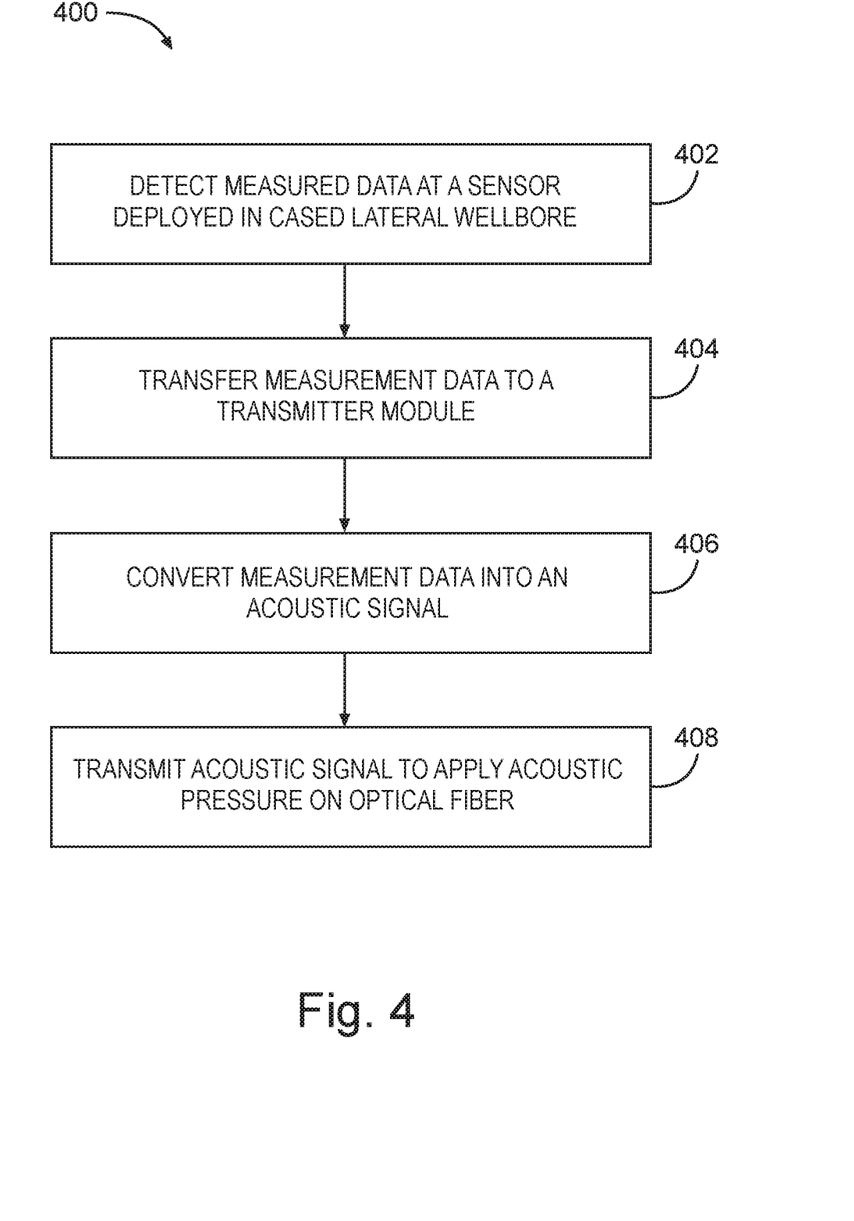
FIG. 4 is a flow diagram illustrating an example method for conducting multilateral well measurements, according to one or more embodiments.

FIG. 4 is a flow diagram illustrating an example method 400 for conducting multilateral well measurements, according to one or more embodiments. The method 400 begins at operation 402 by detecting measurement data at a sensor deployed a cased lateral wellbore. The sensors are operable to provide a measurement relating to wellbore conditions within lateral wellbores. In some embodiments, the sensors can comprise temperature, pressure, and/or flow rate sensors based on electro-acoustic technology (EAT). However, the sensor can be realized in a number of different ways depending on a parameter of interest to be determined by the measurement. The parameter of interest can include, but is not limited to, pressure, strain, resistivity, chemical composition, chemical concentration, flow rate, temperature, or gas/liquid ratios. Further, the sensor can include, but is not limited to: seismic, chemical, electromagnetic, resistive, inductive, pH, and other sensors for wellbore sensing in hydrocarbon wells. In one example, the sensor is an EAT flow sensor mounted in the cased lateral wellbore in front of a production zone. By positioning the sensor in front of a production zone, the flow of that zone can be determined.

The method 400 continues at operation 404 by transferring the measurement data to a transmitter module that is communicably coupled to the sensor. In one embodiment, the transmitter module is connected to the sensor using electrical wiring. Alternatively, the sensor can be connected in parallel or other means of providing redundancy.

The method 400 continues at operation 406 by converting the measurement data into an acoustic signal correlated with the measurement data. For example, the transmitter module can include processing circuitry that is structured to receive the measurement data (e.g., flow in a lateral wellbore) and generate an acoustic signal. For example, the processing circuitry is capable of taking pressure, temperature, and/or flow measurements, and converting the data into an acoustic signal for transmission. In one embodiment, the transmitter module includes an acoustic signal generator which includes non-contact, piezo electric material (e.g., piezo-ceramics) that emits acoustic energy. The transmitter module converts electrical sensor input (e.g., digital or analog measurement data from the sensor) into an acoustic frequency output that is emitted in proportion to the frequency of the electrical input. The processing circuitry may include different individual circuits of the types described in reference to processing circuitry 234 of FIG. 2; in combination with one or more transducers as also described in reference to FIG. 2.

At operation 408, the acoustic signal is transmitted to apply acoustic pressure on an optical fiber deployed within a cased parent wellbore that intersects the cased lateral wellbore. The acoustic signals travel across the multilateral junction between the cased parent wellbore and lateral wellbore, either through fluids in the well or through production tubing, to the optical fiber. Ideally, the transmitter module is positioned as close as possible to the optical fiber to obtain higher quality signal transmission. The acoustic signals/acoustic energy transmitted by the transmitter module is modulated on to the fiber optic cable by generating perturbations in the optical fiber cable that alter the physical characteristics of the fiber, which affects propagation of light. The modulation of the light propagation is a function of the signal used to generate the perturbation and thus communicate the data represented by the acoustic signal to the interrogator (e.g., surface interrogation unit 230 in FIG. 2). It is noted that different transmitter modules can be operated at a different frequency from each other, such that multiple transmitter modules can feed into a single optical fiber without interference.

In this way, sensor measurements (e.g., pressure, temperature, and flow rate) from sensors are conveyed using acoustic signals (e.g., sound) to a deployed optical fiber using frequency bands to transmit digital information or frequency modulation to transmit analog information. Time of flight in a time domain based fiber optic sensing system may allow spatial separation between sensors.

In some embodiments, an optional receiver receives the acoustic signals from the lateral wellbores. The acoustic signal can be detected by, for example, a receiver positioned above the multilateral junction in the parent wellbore. For example, if downhole conditions are such that the received signal to noise ratio at the optical fiber is insufficient, the receiver can be used to amplify and filter the acoustic signals coming from the lateral branches before transducing the received and modified acoustic signal onto the optical fiber. In one embodiment, the receiver includes a piezo electric receiver that detects acoustic signal transmissions from transmitter modules. The receiver is coupled to the optical fiber cable and transmits the data it receives to the cable.

Thus, the receiver is communicably coupled to the optical fiber and can be used to amplify signals coming from lateral wellbores. The amplified signals are modulated onto the fiber optic cable, which is communicably coupled to a surface interrogation unit. The surface interrogation unit extracts data from the optical fiber and decodes the data to determine, for example, flow rate (single or multi-phase), pressure, and temperature at each production zone in the lateral branches.

Many advantages can be gained by implementing the systems and methods described herein. For example, in some embodiments, a well sensing using transmitters to transmit acoustic signals across multilateral junctions enables real time monitoring of flow, temperature, and pressure of multiple zones in a multilateral well without requiring fiber or wiring across the multilateral junction into the parent wellbore. Multiple lateral branches can be monitored using different frequency settings for each transmitter. Further, sensors, transmitters, and receivers of the sensing system can use energy harvesting and does not require connections to energy sources from the surface. This enables operators to perform real-time monitoring of conditions inside lateral branches with a system that bypasses obstructions and/or transmits data across devices where direct electrical or optical transmission is difficult or not possible. Given that lateral branches of a well can run across extended distances (e.g., for thousands of fee through multiple production zones), the ability to monitor flow, pressure, and temperature in the lateral branches would be beneficial to multilateral well production.

Although specific embodiments have been illustrated and described herein, it should be appreciated that any arrangement calculated to achieve the same purpose may be substituted for the specific embodiments shown. This disclosure is intended to cover any and all adaptations or variations of various embodiments.

Combinations of the above embodiments, and other embodiments not specifically described herein, will be apparent to those of skill in the art upon reviewing the above description.

Although specific embodiments have been illustrated and described herein, it will be appreciated by those of ordinary skill in the art that any arrangement that is calculated to achieve the same purpose may be substituted for the specific embodiments shown. Various embodiments use permutations or combinations of embodiments described herein.

The following numbered examples are illustrative embodiments in accordance with various aspects of the present disclosure.

1. A system for use in a cased parent wellbore and a cased lateral wellbore intersecting at a lateral junction may include a cased parent wellbore and a cased lateral wellbore intersecting at a lateral junction, a sensor deployed within the cased lateral wellbore that is communicably coupled to a transmitter module, in which the transmitter module is deployed within the cased lateral wellbore downhole of the lateral junction and configured to generate acoustic signals; and an optical fiber cable deployed within the cased parent wellbore and configured to receive acoustic signals transmitted by the transmitter module in the cased lateral wellbore.

2. The system of example 1, in which the sensor is a pressure sensor, a temperature, or a flow rate sensor.

3. The system of any of the preceding examples, further including a receiver module deployed within the cased parent wellbore.

4. The system of any of the preceding examples, in which the receiver module is configured to receive acoustic signals transmitted by the transmitter module and transduce acoustic signals onto the optical fiber cable.

5. The system of any of the preceding examples, in which the transmitter module is operable to generate a perturbation to the optical fiber cable based on a measurement from the sensor.

6. The system of any of the preceding examples, further including a surface interrogator operable to inject a laser pulse into the optical fiber cable, and in which the acoustic signals received at the optical fiber cable modulates back scattered light generated by the laser pulse.

7. The system of any of the preceding examples, in which the surface interrogator is operable to interrogate the optical fiber cable based on coherent Rayleigh scattering or Fabry-Perot principles.

8. The system of any of the preceding examples, in which the sensor includes an energy harvester for supplying power to the sensor.

9. The system of any of the preceding examples, further including a packer deployed in the cased lateral wellbore to seal off the cased lateral wellbore from the parent wellbore.

10. The system of any of the preceding examples, in which the transmitter module is deployed within the cased lateral wellbore downhole of the packer.

11. A method includes detecting a measurement data at a sensor deployed in a cased lateral wellbore, transferring the measurement data to a transmitter module that is communicably coupled to the sensor, converting the measurement data into an acoustic signal correlated with the measurement data, and transmitting the acoustic signal to apply acoustic pressure on an optical fiber deployed within a cased parent wellbore that intersects the cased lateral wellbore.

11. The method of example 11, further including modulating a light signal within the optical fiber based on the acoustic pressure, in which the modulated light signal represents the measurement data.

13. The method of either of examples 11 or 12, further including transmitting the modulated light signal to a surface detector for analyses.

14. The method of any of examples 10-13, further including extracting the acoustic signal correlated with the measurement data from the optical fiber using an interrogator.

15. The method of any of examples 10-14, in which extracting the parameter includes extracting a value of the measurement data in response to receiving an optical signal backscattered in the optical fiber.

16. The method of any of examples 10-15, in which extracting the parameter includes interrogating the optical fiber based on coherent Rayleigh scattering or Fabry-Perot principles.

17. The method of any of examples 10-16, in which the acoustic signal is transmitted at a distance to the optical fiber.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system for use in a cased parent wellbore and a cased lateral wellbore intersecting at a lateral junction, comprising:
   a sensor deployed within the cased lateral wellbore that is communicably coupled to a transmitter module, wherein the transmitter module is deployed within the cased lateral wellbore downhole of the lateral junction and configured to generate acoustic signals; and
   an optical fiber cable deployed within the cased parent wellbore and configured to receive acoustic signals transmitted by the transmitter module in the cased lateral wellbore.

2. The system of claim 1, wherein the sensor comprises a pressure sensor, a temperature, or a flow rate sensor.

3. The system of claim 1, further comprising a receiver module deployed within the cased parent wellbore.

4. The system of claim 3, wherein the receiver module is configured to receive acoustic signals transmitted by the transmitter module and transduce acoustic signals onto the optical fiber cable.

5. The system of claim 1, wherein the transmitter module is operable to generate a perturbation to the optical fiber cable based on a measurement from the sensor.

6. The system of claim 1, further comprising a surface interrogator operable to inject a laser pulse into the optical fiber cable, and wherein the acoustic signals received at the optical fiber cable modulates back scattered light generated by the laser pulse.

7. The system of claim 6, wherein the surface interrogator is operable to interrogate the optical fiber cable based on coherent Rayleigh scattering or Fabry-Perot principles.

8. The system of claim 1, wherein the sensor includes an energy harvester for supplying power to the sensor.

9. The system of claim 1, further comprising a packer deployed in the cased lateral wellbore to seal off the cased lateral wellbore from the parent wellbore.

10. The system of claim 9, wherein the transmitter module is deployed within the cased lateral wellbore downhole of the packer.

11. A method, comprising:
    detecting a measurement data at a sensor deployed in a cased lateral wellbore;

transferring the measurement data to a transmitter module that is communicably coupled to the sensor;

converting the measurement data into an acoustic signal correlated with the measurement data; and transmitting the acoustic signal to apply acoustic pressure on an optical fiber deployed within a cased parent wellbore that intersects the cased lateral wellbore.

12. The method of claim 11, further comprising: modulating a light signal within the optical fiber based on the acoustic pressure, wherein the modulated light signal represents the measurement data.

13. The method of claim 12, further comprising: transmitting the modulated light signal to a surface detector for analyses.

14. The method of claim 11, further comprising: extracting the acoustic signal correlated with the measurement data from the optical fiber using an interrogator.

15. The method of claim 14, wherein extracting the parameter includes extracting a value of the measurement data in response to receiving an optical signal backscattered in the optical fiber.

16. The method of claim 14, wherein extracting the parameter includes interrogating the optical fiber based on coherent Rayleigh scattering or Fabry-Perot principles.

17. The method of claim 11, wherein the acoustic signal is transmitted at a distance to the optical fiber.

* * * * *